(12) United States Patent
Chae

(10) Patent No.: US 8,341,959 B2
(45) Date of Patent: Jan. 1, 2013

(54) HEAT ENGINE USING SOLAR ENERGY

(76) Inventor: Soo-Joh Chae, Seoul (KR)

( * ) Notice: Subject to any disclaimer, the term of this patent is extended or adjusted under 35 U.S.C. 154(b) by 0 days.

(21) Appl. No.: 13/190,697

(22) Filed: Jul. 26, 2011

(65) Prior Publication Data
US 2011/0277472 A1    Nov. 17, 2011

Related U.S. Application Data

(63) Continuation of application No. PCT/KR2010/000684, filed on Feb. 4, 2010.

(30) Foreign Application Priority Data

Feb. 4, 2009    (KR) .................. 10-2009-0008741

(51) Int. Cl.
*F03G 6/00* (2006.01)
*F03G 7/00* (2006.01)
*F01K 25/00* (2006.01)
(52) U.S. Cl. ............... 60/641.15; 60/641.14; 60/516
(58) Field of Classification Search ............ 60/516–526, 60/641.8–641.15; 126/683–703
See application file for complete search history.

(56) References Cited

U.S. PATENT DOCUMENTS

| 4,173,123 | A | * | 11/1979 | Gurtler .................. 60/641.13 |
| 4,229,660 | A | * | 10/1980 | Adler .................. 290/2 |
| 4,342,920 | A | * | 8/1982 | Bucknam .................. 290/1 R |
| 4,353,212 | A | * | 10/1982 | Adler .................. 60/622 |
| 4,452,047 | A | * | 6/1984 | Hunt et al. .................. 60/641.15 |
| 8,209,984 | B2 | * | 7/2012 | Penciu .................. 60/641.15 |
| 2010/0043434 | A1 | | 2/2010 | Ortiz et al. |
| 2011/0209476 | A1 | | 9/2011 | Chae |

FOREIGN PATENT DOCUMENTS

| JP | 55005418 | 1/1980 |
| JP | 5272409 | 10/1993 |

OTHER PUBLICATIONS

PCT International Search Report dated Oct. 6, 2010 received in corresponding PCT Application No. PCT/KR2010/000684, 2 pgs.
PCT International Preliminary Report/Translation of Written Opinion, dated Sep. 13, 2011 received in corresponding PCT Application No. PCT/KR2010/000684, 5 pgs.

* cited by examiner

*Primary Examiner* — Thomas Denion
*Assistant Examiner* — Christopher Jetton
(74) *Attorney, Agent, or Firm* — Grossman Tucker Perreault & Pfleger, PLLC

(57) ABSTRACT

A heat engine using solar energy is disclosed. The heat engine in accordance with an embodiment of the present invention includes a first body, a second body and a solar concentrator, and can have highly efficient thermal cycles by allowing a first piston assembly and a second piston assembly to reciprocate opposite directions with respect to each other inside a first cylinder and a second cylinder, respectively, as first operating gas and fourth operating gas or second operating gas and third operating gas thermally expand alternately.

16 Claims, 12 Drawing Sheets

HEAT ENGINE USING SOLAR ENERGY

CROSS-REFERENCE TO RELATED APPLICATIONS

The present application is a continuation of prior PCT Application No. PCT/KR2010/000684 filed on Feb. 4, 2010, which is fully incorporated herein by reference.

TECHNICAL FIELD

The present invention relates to a heat engine, more specifically to a heat engine using solar energy.

BACKGROUND ART

There has been an increased interest in alternative energy recently due to the draining oil reserves and environmental problems. The most spotlighted type of alternative energy is the solar energy power generation system.

Methods of producing electricity using solar energy include converting sunlight directly to electric energy and driving a generator with a heat engine using solar heat.

A solar power generator, which converts the solar energy directly to electricity, uses solar cells and is widely used because it is durable and easy to make the power generation system semi-automatic or automatic.

However, only some portions of sunlight, i.e., visible rays and a portion of infrared rays, can be used for the solar cells, and most photons in long wavelength infrared rays have low energy and thus cannot be used for generation of electricity but increase the temperature of the solar cells, thereby lowering the efficiency of power generation. Moreover, the solar cells are expensive and have a significantly lower efficiency of power generation than the heat engines.

Meanwhile, there have been active studies for a concentrating solar power (CSP) generator. External combustion engines used for the CSP generator include the Stirling engine and the turbine engine, which follows the Brayton cycle, and are generally higher in efficiency than the solar cells. Particularly, the solar dish type CSP generator using the Stirling engine has the highest efficiency of power generation.

When the Stirling engine is used, the heater of the Stirling engine is heated by the solar heat. The Stirling engine is a kind of external combustion engine that seals up operating gas, such as hydrogen or helium, in a space made with a cylinder and a piston and heats up and cools down this operating gas from the outside to reciprocate the piston to obtain mechanical energy. The Stirling engine has a high thermal efficiency with a cycle that is similar to the Carnot engine, which is an ideal engine.

However, since such a Stirling engine transfers the heat to the operating gas through the heater walls, the temperature that the operating gas can reach is limited, and energy is lost due to thermal conduction of a cooler. To minimize this problem, a high level of technology is required using hastelloy, which is a special alloy, but is not widely commercialized.

In order for an external combustion engine, such as the Stirling engine, to have a high thermal efficiency, the operating gas needs to repeatedly reach a high temperature and a low temperature. However, since the external combustion engine operated by the solar heat is constantly heated from the outside, unlike the internal combustion engine, in which a high temperature is reached instantly by combustion, the operating gas becomes expanded before it is sufficiently heated and reaches a high temperature, thereby lowering the efficiency of the heat engine. Particularly, in a linear heat engine that is operated by a free piston, strokes are restricted by heating compression pressure and cooling expansion of the operating gas, which acts on either side of the free piston.

Moreover, most heat engines convert a rectilinear motion to a rotary motion using a crank, according to thermal expansion of the gas inside the cylinder. During this conversion, much power is lost due to friction. Accordingly, there has been efforts to develop a linear power generator that is constituted with the free piston, but such efforts have been inhibited by the vibration and control problems.

In a power generator that converts mechanical energy to electrical energy after the solar energy is converted to the mechanical energy, the vibrations and torque generated when the solar energy is converted to the mechanical energy are transferred to a device that concentrates the solar energy, and thus the concentrated solar energy becomes out of focus. Moreover, these vibrations and torque overexert the power generator and shorten the life of the power generator.

DISCLOSURE

Technical Problem

Figure 1:
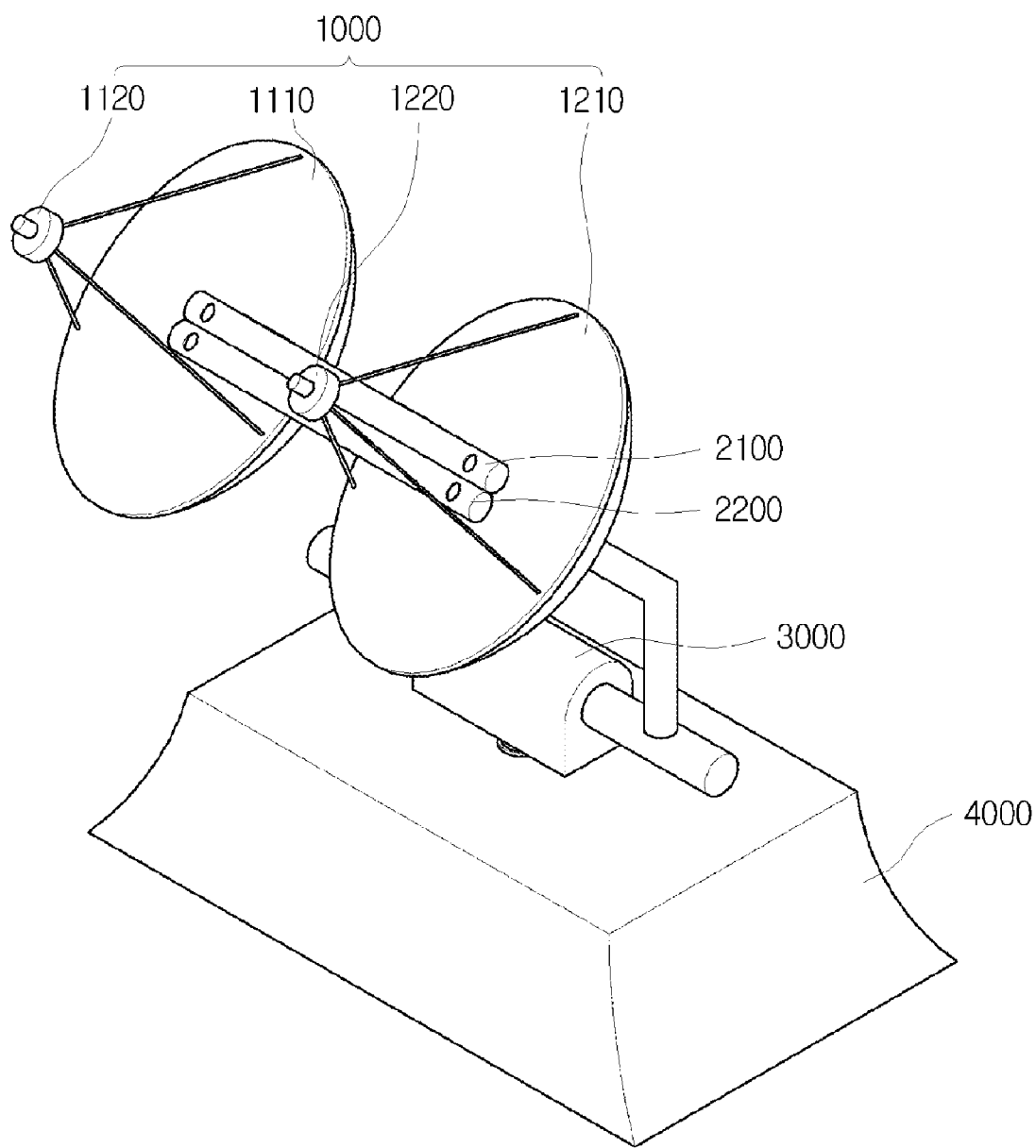
FIG. 1 is a perspective view briefly illustrating a heat engine in accordance with an embodiment of the present invention.

The present invention provides a heat engine that is highly efficient by using an effect of directly heating the operating gas with light.

The present invention also provides a heat engine using solar energy that has simpler structure than the conventional Stirling engine and thus costs less to manufacture and is easier for maintenance and repair.

The present invention also provides a heat engine using solar energy that minimizes vibrations and torque generated when solar energy is converted to mechanical energy.

Technical Solution

An aspect of the present invention features a heat engine using solar energy. The heat engine in accordance with an embodiment of the present invention can include: a first body, which can include a first cylinder having first operating gas and second operating gas held inside either side thereof and having a first light-permeating part and a second light-permeating part arranged on either side thereof and a first piston assembly including a first piston and a second piston slidably arranged inside either side of the first cylinder and a first connector connecting the first piston with the second piston; a second body, which can include a second cylinder having third operating gas and fourth operating gas held inside either side thereof and having a third light-permeating part and a fourth light-permeating part corresponding respectively to the first light-permeating part and the second light-permeating part arranged on either side thereof and a second piston assembly including a third piston and a fourth piston slidably arranged inside either side of the second cylinder and a second connector connecting the third piston with the fourth piston, the second body being arranged adjacent to and parallel to the first body; and a solar concentrator configured to converge sunlight and to transfer the converged sunlight alternately to the first light-permeating part and the fourth light-permeating part or to the second light-permeating part and the third light-permeating part to thermally expand the first operating gas and the fourth operating gas alternately or the second operating gas and the third operating gas alternately. The first piston assembly and the second piston assembly can reciprocate in opposite directions to each other inside the first cylinder and the second cylinder, respectively, as the first operating gas and the fourth operating gas or the second operating gas or the third operating gas thermally expand alternately.

The heat engine in accordance with an embodiment of the present invention can also include an interlocking part interlocking the first piston assembly with the second piston assembly.

The interlocking part can include: a first rack portion formed on one side of the first connector; a second rack portion formed on a side of the second connector facing the first connector; and a pinion interlocking with the first rack portion and the second rack portion.

The first body can also include: a first cooling part arranged on one side of the first cylinder and configured to cool the first operating gas that is expanded; and a second cooling part arranged on the other side of the first cylinder and configured to cool the second operating gas that is expanded. The second body can also include: a third cooling part arranged on one side of the second cylinder and configured to cool the third operating gas that is expanded; and a fourth cooling part arranged on the other side of the second cylinder and configured to cool the fourth operating gas that is expanded.

Black body powder can be held together with the first to fourth operating gases inside either side of the first cylinder and the second cylinder.

The solar concentrator can include: a pair of light-gathering panels facing the sun; and a pair of reflectors configured to re-reflect the sunlight reflected from the pair of light-gathering panels toward the first body and the second body, respectively. Each of the pair of reflectors can be configured to adjust a path of re-reflecting the sunlight.

Each of the pair of reflectors can adjust the path of re-reflecting the sunlight by detecting locations of the first piston assembly and the second piston assembly.

The first light-permeating part and the second light-permeating part can be arranged on either side end of the first cylinder, and the third light-permeating part and the fourth light-permeating part can be arranged on either side end of the second cylinder. The solar concentrator can include: a pair of focusing lenses separated from each other and configured to transfer the sunlight to the first body and the second body, respectively; a pair of movable reflecting mirrors arranged on either side of the first body and configured to reflect the sunlight transferred through the focusing lenses to the first light-permeating part and the second light-permeating part, respectively; and a pair of static reflecting mirrors arranged on either side of the second body and configured to reflect the sunlight transferred through the focusing lenses to the third light-permeating part and the fourth light-permeating part, respectively. Angles of the movable reflecting mirrors can be adjustable such that the sunlight having passed through the focusing lenses reaches the static reflecting mirrors or is blocked by the movable reflecting mirrors.

The heat engine in accordance with an embodiment of the present invention can also include: a first power generator, which can include a first mover including a first magnet arranged on an outer wall of the first piston, a second mover including a second magnet arranged on an outer wall of the second piston, a first stator arranged on an outer circumferential surface of the first cylinder in correspondence with the first mover and configured to generate induced electromotive force by interacting with the first mover that reciprocates, and a second stator arranged on an outer circumferential surface of the first cylinder in correspondence with the second mover and configured to generate induced electromotive force by interacting with the second mover that reciprocates; and a second power generator, which can include: a third mover including a third magnet arranged on an outer wall of the third piston, a fourth mover including a fourth magnet arranged on an outer wall of the fourth piston, a third stator arranged on an outer circumferential surface of the second cylinder in correspondence with the third mover and configured to generate induced electromotive force by interacting with the third mover that reciprocates, and a fourth stator arranged on an outer circumferential surface of the second cylinder in correspondence with the fourth mover and configured to generate induced electromotive force by interacting with the fourth mover that reciprocates.

Advantageous Effects

The heat engine in accordance with some embodiments of the present invention can have one or more of the following advantageous effects.

First, a high thermal efficiency can be expected by following a new type of thermal cycle, more specifically, a thermal cycle in between the Carnot engine and the Stirling engine, formed by heating expansion, in which thermal energy is supplied with the sunlight, and cooling compression resulted from direct contact with the low-temperature cooling part. That is, the thermal cycle is completed by heating and expanding the operating gas by the direct sunlight while the operating gas is compressed by the free piston and by cooling and compressing the expanded operating gas by having the operating gas to make contact with the cooling part while the sunlight is not provided.

Second, a high thermal efficiency can be expected because the heat engine of the present invention can be operated at much higher temperatures since photo-absorbing material (black body powder) mixed in the sealed operating gas converts the converged sunlight to heat and directly heats the gas.

Third, complicated valve operations of an internal combustion engine or movement of operating gas in the conventional Stirling engine can be performed by simply tilting the reflectors and exposing the operating gas to the cooling part by moving the piston. Moreover, by including a power generator that converts mechanical energy to electrical energy by use of the movers and stators arranged on the piston and the cylinder, the electricity can be effectively produced through a simpler structure.

Fourth, a high density of output per volume can be achieved because the air-tight structure, in which the piston reciprocates inside the sealed cylinder, makes it easy to operate the high-pressure gas.

Fifth, since the heat engine of the present invention is an external combustion engine that heats the sealed operating gas with an outside heat source, lubricant inside the heat engine of the present invention is virtually perpetual, unlike an internal combustion engine, in which the lubricant inside the cylinder becomes degenerated.

Sixth, by arranging the first body and the second symmetrically, adverse effects of mechanical vibrations and torque caused by reciprocating motions of the piston to the heat engine can be reduced.

DESCRIPTION OF KEY ELEMENTS

1000: solar concentrator
2100: first body
2110: first cylinder
101: first piston assembly
2200: second body
2210: second cylinder
201: second piston assembly
2500: first power generator
2600: second power generator

MODE FOR INVENTION

The advantages and features, and the methods for achieving the advantages and features, of the present invention will become apparent through the embodiments described below in detail with reference to the accompanying drawings. This, however, shall not restrict the present invention to the embodiments disclosed herein, and it shall be apparent that the present invention can be embodied in various forms. The embodiments described below shall only realize the present invention, which shall only defined by the appended claims, and are provided to disclose the scope of the invention to those who are ordinarily skilled in the art to which the present invention pertains. Throughout the description, same reference numerals will be used for same elements.

Hereinafter, a heat engine in accordance with certain embodiments of the present invention will be described with reference to the accompanying drawings. When it is deemed that detailed description of certain related known functions or elements will evade the gist of the present invention, such detailed description will not be provided.

FIG. 1 is a perspective view briefly illustrating a heat engine in accordance with an embodiment of the present invention. Referring to FIG. 1, a heat engine 1 in accordance with the present embodiment can be constituted by including a solar concentrator 1000, a first body 2100 and a second body 2200.

The first body 2100 and the second body 2200 can convert the sunlight received from the solar concentrator 1000 to mechanical energy.

Figure 2:
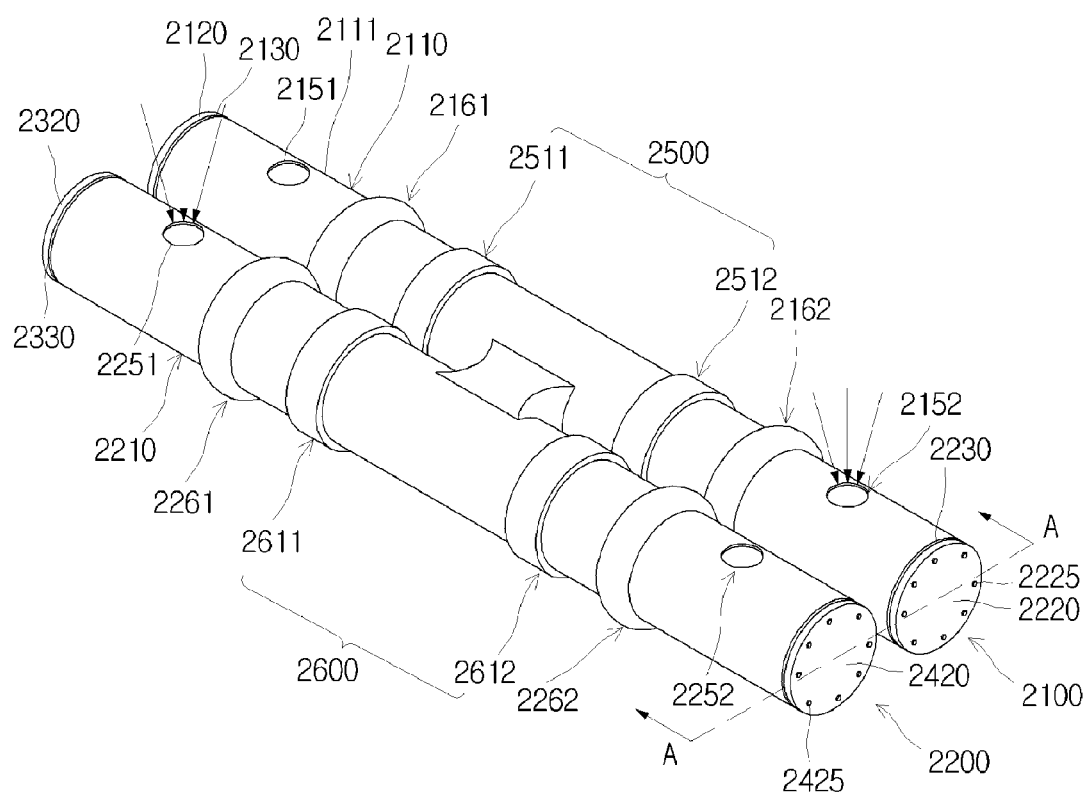
FIG. 2 is a perspective view briefly illustrating a portion of the heat engine in accordance with an embodiment of the present invention.
Figure 3:
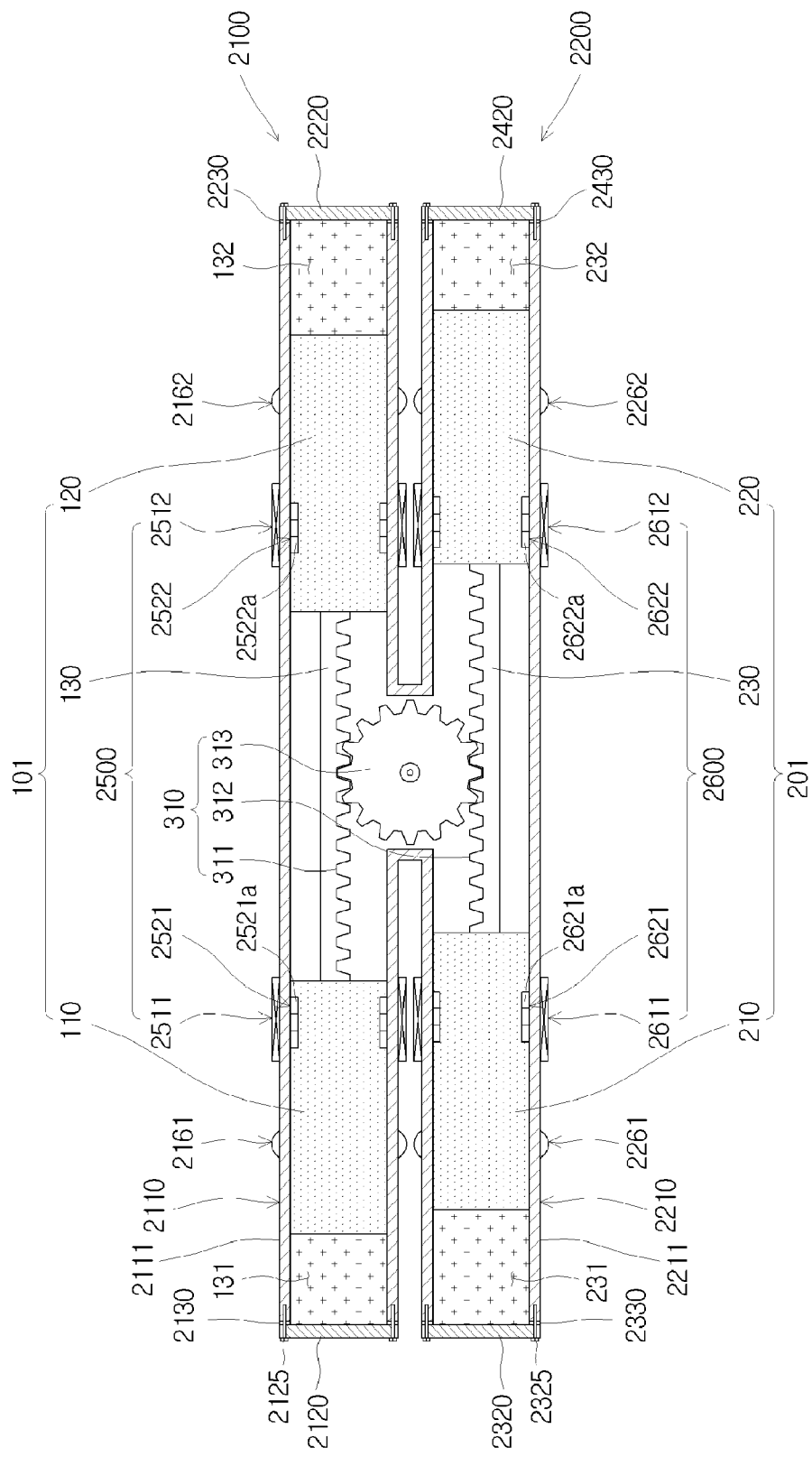
FIG. 3 is a cross-sectional view illustrating the A-A section of the portion shown in FIG. 2.

FIG. 2 is a perspective view briefly illustrating a portion of the heat engine in accordance with an embodiment of the present invention, and FIG. 3 is a cross-sectional view illustrating the A-A section of the portion shown in FIG. 2.

Referring to FIGS. 2 and 3, the first body 2100 can include a first cylinder 2110 and a first piston assembly 101. The first cylinder 2110 can hold first operating gas and second operating gas inside either side thereof. The first cylinder 2110 can be provided with a first light-permeating part 2151 and a second light-permeating part 2152 on either side thereof. The first and second light-permeating parts 2151, 2152 can allow the sunlight transferred by the solar concentrator 1000 to penetrate into the first cylinder 2110. In such a case, the sunlight transferred into the first cylinder 2110 can heat up and expand the first and second operating gases.

The first body 2200 can include a second cylinder 2210 and a second piston assembly 201. The second cylinder 2210 can hold third operating gas and fourth operating gas inside either side thereof. The second cylinder 2210 can be provided with a third light-permeating part 2251 and a fourth light-permeating part 2252 on either side thereof. The third and fourth light-permeating parts 2251, 2252 can allow the sunlight transferred by the solar concentrator 1000 to penetrate into the second cylinder 2210. The third and fourth light-permeating parts 2251, 2252 can respectively correspond to the first and second light-permeating parts 2151, 2152.

According to the present embodiment, the first body 2100 and the second body 2200 can be adjacently arranged in parallel to each other. In such a case, outer walls of the first cylinder 2110 and the second cylinder 2210 can be connected with each other.

Portion of surfaces the first cylinder 2110 and the second cylinder 2210 that face each other can be provided with an opening. In this case, the inside of the first cylinder 2110 and the inside of the second cylinder 2210 can be connected with each other. A pinion 313, which will be described later, can be arranged in the opening.

Figure 4:
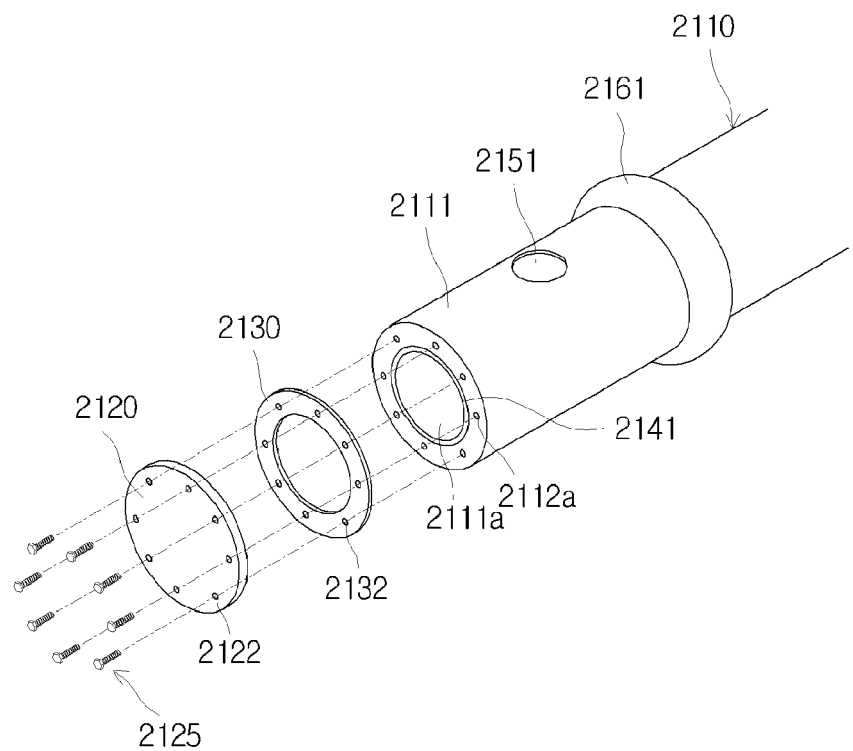
FIG. 4 is a perspective view of one end portion of a first cylinder in the heat engine in accordance with an embodiment of the present invention.
Figure 5:
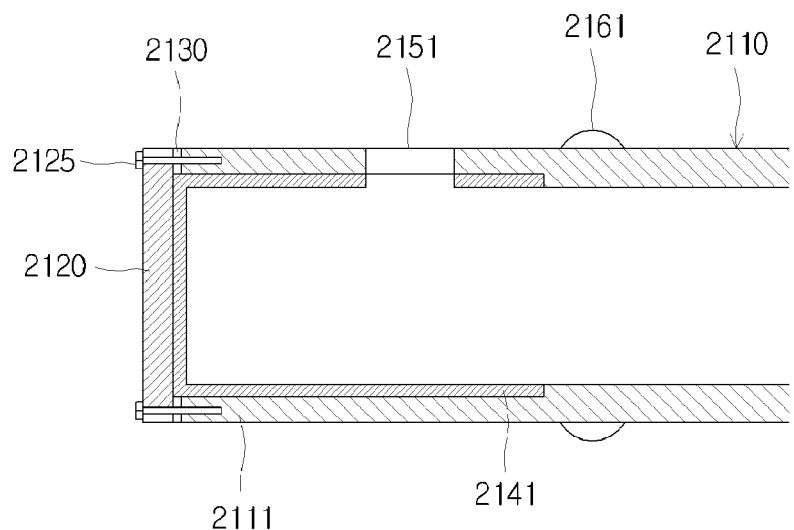
FIG. 5 is a cross-sectional view of the one end portion of the first cylinder in the heat engine in accordance with an embodiment of the present invention.

FIG. 4 is a perspective view of one end portion of the first cylinder in the heat engine in accordance with an embodiment of the present invention, and FIG. 5 is a cross-sectional view of the one end portion of the first cylinder in the heat engine in accordance with an embodiment of the present invention. The following description of the first cylinder can be equally applied to the other end portion of the first cylinder as well as the second cylinder.

Referring to FIGS. 4 and 5, the first cylinder 2110 can be constituted by including a cylinder body 2111 and a cylinder head 2120. The cylinder body 2111 can be formed in a cylindrical shape and can have an open face 2111a that is opened to one side thereof. The cylinder head 2120 can be coupled to an end of the one side, on which the open face 2111a is formed, of the cylinder body 2111. The cylinder head 2120 is coupled to the cylinder body 2111 by fastening means such as bolts 2125 and seals up the open face 2111a. In such a case, a plurality of fastening grooves 2112a can be formed on the end of the one side of the cylinder body 2111 in order to fasten the bolts 2125.

The cylinder head 2120 can be formed as a disk having a predetermined thickness. The cylinder head 2120 has a diameter that is greater than or equal to a diameter of the end of the one side of the cylinder body 2111 and is provided with a plurality of bolt holes 2122, corresponding to the fastening grooves 2112a of the cylinder body 2111, along its boundaries so as to be fastened to the end of the one side of the cylinder body 2111 by, for example, the bolts 2125.

In this case, a circular sealing member 2130, for example, a silicon packing, can be interposed between the cylinder head 2120 and the end of the one side of the cylinder body 2111. Accordingly, the tightness of the first cylinder 2110 is enhanced so that the operating gas inside the first cylinder 2110 is not leaked out. The sealing member 2130 can be provided with a plurality of bolt holes 2132 through which the bolts 2125 can penetrate.

The first cylinder 2110 can also include a cylinder insulation member 2141 that is placed on an inner wall of the end of the one side of the cylinder body 211 and an inner wall of the cylinder head 2120. In such a case, the cylinder body 2111 can be made of stainless steel, and the cylinder insulation member 2141 can be made of ceramic, silica, etc.

The cylinder insulation member 2141 stops heat that is transferred to the first operating gas held inside the first cylinder 2110 through the first light-permeating part 2151 from escaping to the outside through the cylinder body 2111 and the cylinder head 2120.

Referring to FIG. 3, the first piston assembly 101 can be arranged inside the first cylinder 2110. The first piston assembly 101 can include a first piston 110, a second piston 120 and a first connector 130.

The first and second pistons 110, 120 can be slidably arranged inside either side of the first cylinder 2110. In such a case, a first chamber 131 and a second chamber 132, which are defined by the first piston 110 and the second piston 120, respectively, together with the first cylinder 2110, can be formed on either side of the first cylinder 2110. The sizes of the first chamber 131 and the second chamber 132 can vary when the first and second pistons 110, 120 reciprocate inside the first cylinder 2110. The first operating gas and the second operating gas can be held inside the first chamber 131 and the second chamber 132, respectively. The first and second pistons 110, 120 can be connected with each other by the first connector 130, and can be interlocked with each other to slide inside the first cylinder 2110.

The second cylinder 2210 can be provided with a second piston assembly 201 inside thereof. The second piston assembly 201 can include a third piston 210, a fourth piston 220 and a second connector 230.

The third and fourth pistons 210, 220 can be slidably arranged inside either side of the second cylinder 2210. In such a case, a third chamber 231 and a fourth chamber 232, which are defined by the third piston 210 and the fourth piston 220, respectively, together with the second cylinder 2210, can be formed on either side of the second cylinder 2210. The sizes of the third chamber 231 and the fourth chamber 232 can vary when the third and fourth pistons 210, 220 reciprocate inside the second cylinder 2210. The third operating gas and the fourth operating gas can be held inside the third chamber 231 and the fourth chamber 232, respectively. The third and fourth pistons 210, 220 can be connected with each other by the second connector 230, and can be interlocked with each other to slide inside the second cylinder 2210.

Figure 6:
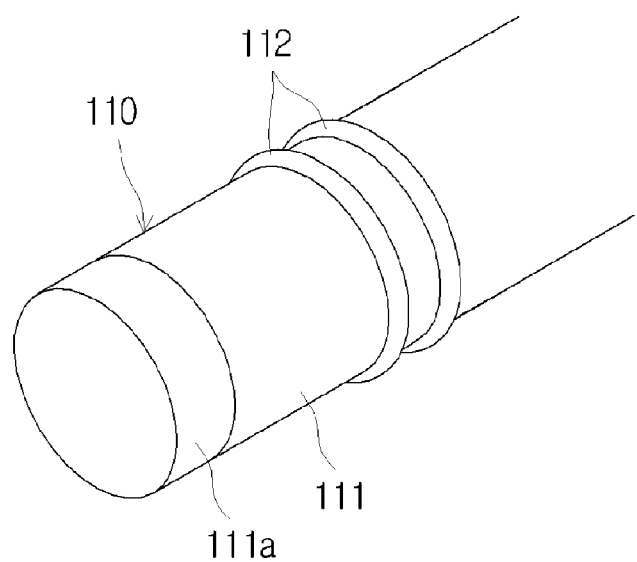
FIG. 6 is a perspective view of a piston in the heat engine in accordance with an embodiment of the present invention.
Figure 7:
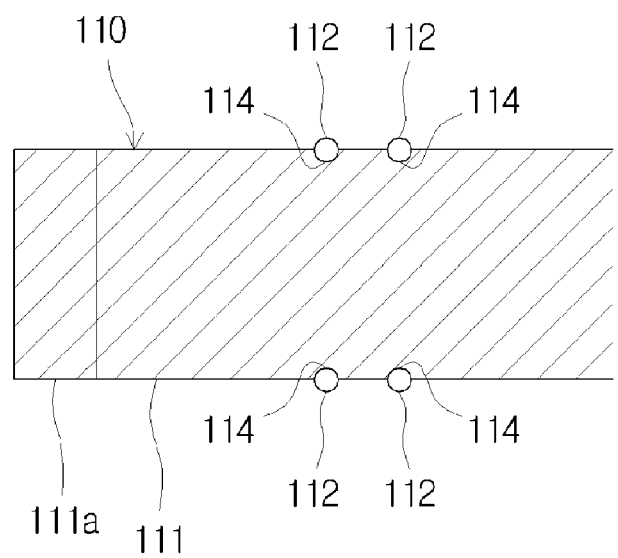
FIG. 7 is a cross-sectional view of the piston in the heat engine in accordance with an embodiment of the present invention.

FIG. 6 is a perspective view of a piston in the heat engine in accordance with an embodiment of the present invention, and FIG. 7 is a cross-sectional view of the piston in the heat engine in accordance with an embodiment of the present invention. The following description of the first piston 110 can be equally applied to the second piston 120, the third piston 210 and the fourth piston 220.

Referring to FIGS. 6 and 7, the first piston 110 can be constituted by including a piston body 111 and a piston ring 112. The piston body 111 can be formed in a cylindrical shape having a diameter corresponding to an inner diameter of the cylinder body 2111. An area 111a of the piston body 111 that is adjacent to the first operating gas can be made of an insulating material, such as a metal with low thermal conductivity or ceramic.

The piston body 111 can provided with at least one piston ring 112 on an outer circumferential surface thereof such that an area making contact with an inner wall of the cylinder body 2111 is sealed up. Such piston ring 112 can be arranged in a piston ring groove 114 provided on the outer circumferential surface of the piston body 111.

The piston ring 112 can approach a first cooling part 2161 arranged on an outer circumferential surface of the first cylinder 2110 when the first piston 110 linearly reciprocate in the first cylinder 2110. Accordingly, the piston ring 112 can include a Teflon ring, and can be made of a material that can be operated in a low temperature.

Although, in the present embodiment, the piston ring 112 is used in order to seal up the contact areas between the piston body 111 and the cylinder body 2111, it shall be appreciated that the present invention is not restricted to what is described herein, and various modifications, for example, arranging a fixing ring in a vertical bearing form on an inner wall of a cylinder body, can be possible.

Referring to FIG. 3, the first to fourth operating gases held respectively in the first to fourth chambers 131, 132, 231, 232 can include high-pressure gas with a good efficiency of thermal conductivity. For example, the first to fourth operating gases can include hydrogen or helium.

In this case, the first to fourth chamber 131, 132, 231, 232 can hold black body powder together with the first to fourth operating gases. The black body powder can include minute particles, for example, carbon particles, which are photochemically stable at a high temperature. The sunlight that entered the first to fourth chamber 131, 132, 231, 232 through the first to fourth light-permeating parts 2151, 2152, 2251, 2252 can be effectively absorbed to the first to fourth operating gases, respectively, by the black body powder. Accordingly, the first to fourth operating gases can be thermally expanded effectively.

Referring to FIG. 3, the heat engine in accordance with the present embodiment can also include an interlocking part 310, which interlocks the first piston assembly 101 with the second piston assembly 202. The interlocking part 310 can include a first rack portion 311, which is formed on one side of the first connector 130, a second rack portion 312, which is formed on a side of the second connector 230 facing the first connector 130, and a pinion 313, which interlocks with the first rack portion 311 and the second rack portion 312.

In this case, the lengths of the first rack portion 311 and the second rack portion 312 can be determined by considering the distance required for performing linear reciprocal motions by the first piston assembly 101 and the second piston assembly 201, respectively.

The first rack portion 311 and the second rack portion 312 are respectively interlocked with the pinion 313. Accordingly, the first piston assembly 101 and the second piston assembly 102 can be symmetrically operated.

More specifically, when the first piston assembly 101 moves to the right side of FIG. 3 inside the first cylinder 2110, the pinion 313 interlocked with the first rack portion 311 rotates clockwise, and this rotation of the pinion 313 moves the second piston assembly 201 formed with the second rack portion 312 to the left side of FIG. 3 inside the second cylinder

2210. Accordingly, this embodiment allows the first piston assembly 101 and the second piston assembly 201 to be interlocked by the interlocking part 310.

In this embodiment, although the interlocking part 301 interlocking the first piston assembly 101 with the second piston assembly 201 is constituted in a rack-and-pinion type, this is only one example, and the first piston assembly and the second piston assembly can be interlocked through various forms of interlocking parts, for example, a Scotch yoke.

Referring to FIG. 3, the first body 2100 in accordance with the present embodiment can also include a first cooling part 2161, which is arranged on one side of the first cylinder 2110, and a second cooling part 2162, which is arranged on the other side of the first cylinder 2110. The second body 2200 in accordance with the present embodiment can also include a third cooling part 2261, which is arranged on one side of the second cylinder 2210, and a fourth cooling part 2262, which is arranged on the other side of the fourth cylinder 2210.

The first cooling part 2161 and the second cooling part 2162 effectively cool and contract the first operating gas and the second operating gas, respectively, which are heated and expanded by the sunlight having passed through the first and second light-permeating parts 2151, 2152. The third cooling part 2261 and the fourth cooling part 2262 effectively cool and contract the third operating gas and the fourth operating gas, respectively, which are heated and expanded by the sunlight having passed through the third and fourth light-permeating parts 2251, 2252.

Referring to FIG. 2, the first cooling part 2161 and the second cooling part 2162 can be arranged on either side of the first cylinder 2110. In this case, the first cooling part 2161 and the second cooling part 2162 can be located more inside than the first light-permeating part 2151 and the second light-permeating part 2152, respectively.

Moreover, the third cooling part 2261 and the fourth cooling part 2262 can be arranged on either side of the second cylinder 2210. In this case, the third cooling part 2261 and the fourth cooling part 2262 can be located more inside than the third light-permeating part 2251 and the fourth light-permeating part 2252, respectively.

In the present embodiment, the first to fourth cooling parts, 2161, 2162, 2261, 2262 are arranged in a ring form on an outer circumferential surface of the cylinder body 2111, but the present invention is not restricted to this, and there can be various modifications.

Figure 8:
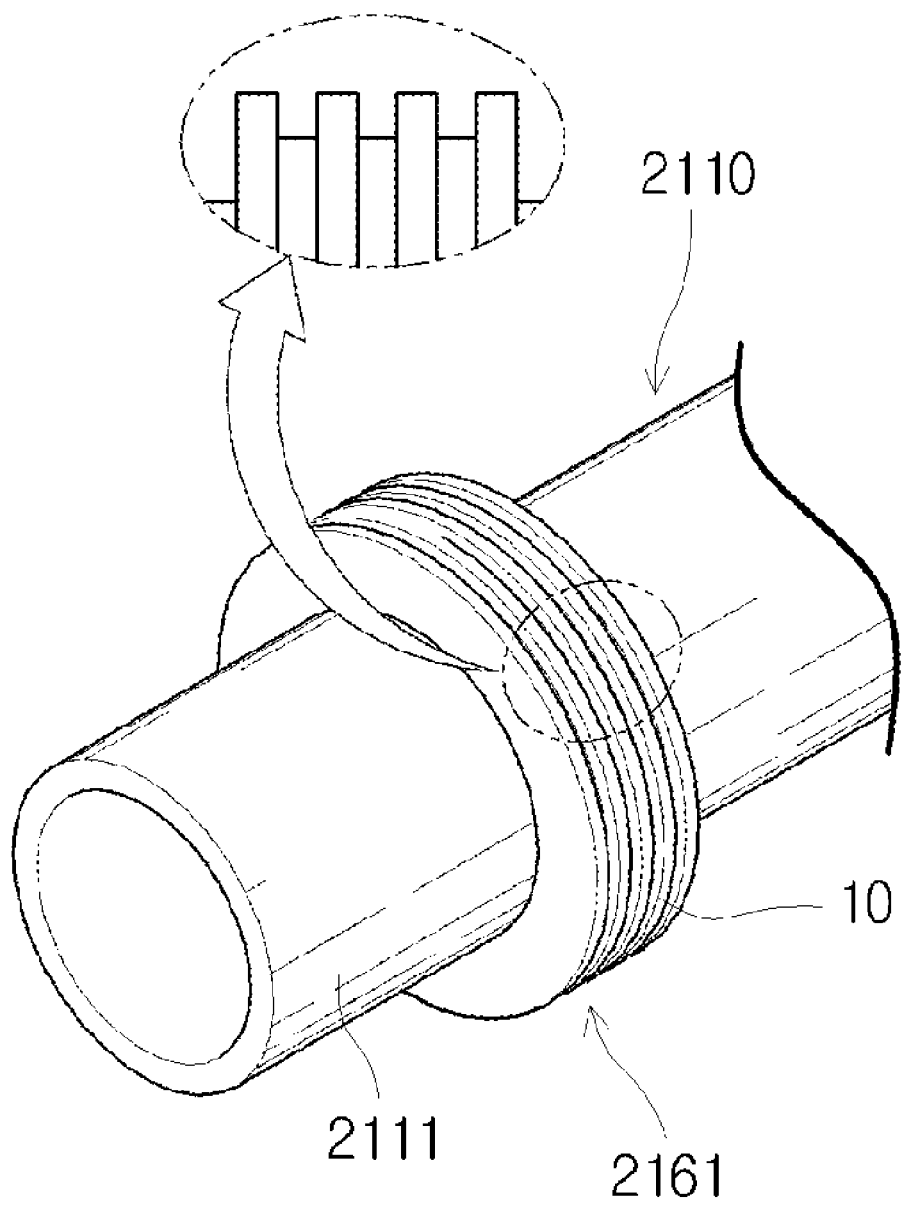
FIG. 8 is a perspective view briefly illustrating a cooling part of a heat engine in accordance with another embodiment of the present invention.
Figure 9:
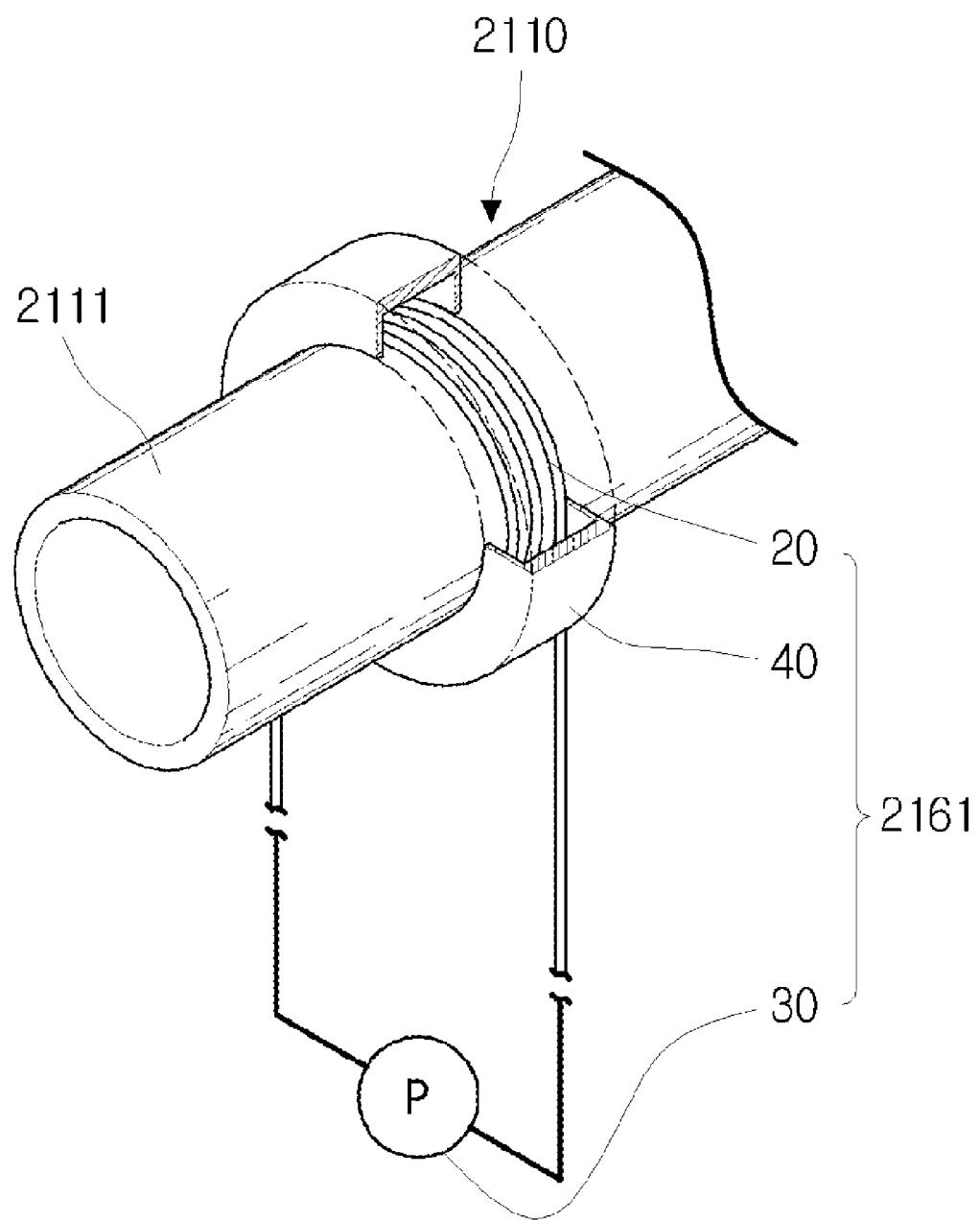
FIG. 9 is a perspective view briefly illustrating a cooling part of a heat engine in accordance with yet another embodiment of the present invention.

FIG. 8 is a perspective view briefly illustrating a cooling part of a heat engine in accordance with another embodiment of the present invention, and FIG. 9 is a perspective view briefly illustrating a cooling part of a heat engine in accordance with yet another embodiment of the present invention. The following description of the first cooling part 2161 with reference to FIGS. 8 and 9 can be equally applied to the second to fourth cooling parts 2162, 2261, 2262.

Referring to FIG. 8, the first cooling part 2161 in accordance with another embodiment of the present invention includes a cooling fin 10, which is formed on the outer circumferential surface of the cylinder body 2111, and a cooling fan (not shown), which cools the cooling fin 10 by supplying air to the cooling fin 10. The first cooling part 2161 in accordance with the present embodiment can air-cool the first operating gas that is heated and expanded inside the cylinder body 2111. In such a case, it is preferable that the cooling fin 10 is formed in a convex-concave type in order to increase the areas making contact with the air such that cooling can be quickly made.

Referring to FIG. 9, the first cooling part 2161 in accordance with yet another embodiment of the present invention can include a cooling tube 20, which is arrange on the outer circumferential surface of the cylinder body 2111, and a cooling pump 30, which supplies cooling water to the cooling pump 20. The cooling tube 20 can be wound a number of times on the outer circumferential surface of the cylinder body 2111. Moreover, the first cooling part 2161 in accordance with the present embodiment can also include a cooling chamber 40, which covers the cooling tube 20. The cooling part 2161 in accordance with the present embodiment can water-cool the first operating gas that is heated and expanded inside the first cylinder body 2111.

Referring to FIG. 1, the solar concentrator 1000 collects the sunlight and transfers the collected sunlight toward the first body 2100 and the second body 2200. The sunlight can be collected in various ways, for example, using a parabolic concave reflector, using a convex lens, etc. Moreover, the primarily collected light can be directly used, or the focus of concentration can be changed using a reflector or a prism.

According to the present embodiment, the solar concentrator 1000 can be constituted by including a pair of light-gathering panels 1110, 1210 and a pair of reflectors 1120, 1220 corresponding to the pair of light-gathering panels 1110, 1210, respectively. The light-gathering panels 1110, 1210 are concave reflecting panels that can reflect and primarily focus the sunlight. The reflectors 1120, 1220 can re-reflect the sunlight that is primarily focused by the light-gathering panels 1110, 1210 toward the first body 2100 and the second body 2200.

In such a case, the first body 2100 and the second body 220 can be arranged in between the light-gathering panels 1110, 1210 and the reflectors 1120, 1220. However, the locations of the first body 2100 and the second body 2200 are not restricted to the above, and various modifications are possible.

For example, the first body 2100 and the second body 2200 can be arranged on rear surfaces of the light-gathering panels 1110, 1210. In other words, the light-gathering panels 1110, 1210 can be interposed between the first and second bodies 2100, 2200 and the reflectors 1120, 1220. In such a case, the sunlight re-reflected by the reflectors 1120, 1220 can be transferred to the first body 2100 and the second body 2200 through openings (not shown) formed on the light-gathering panels 1110, 1210.

The constitution of the solar concentrator 1000 in accordance with the present embodiment is described for illustrative purposes only, and there can be various modifications. For example, in accordance with another embodiment, the solar concentrator can include one light-gathering panel and a reflector that separates and reflects the sunlight primarily collected by the light-gathering panel to a plurality of focal points.

Referring to FIG. 1, the solar concentrator 1000 can be supported by a support frame 4000. In such a case, a sun tracking part 3000 can be interposed between the solar concentrator 1000 and the support frame 4000. Such sun tracking part 300 can operate to allow the solar concentrator 1000 to move about the support frame 4000 according to the sun's track.

Figure 10:
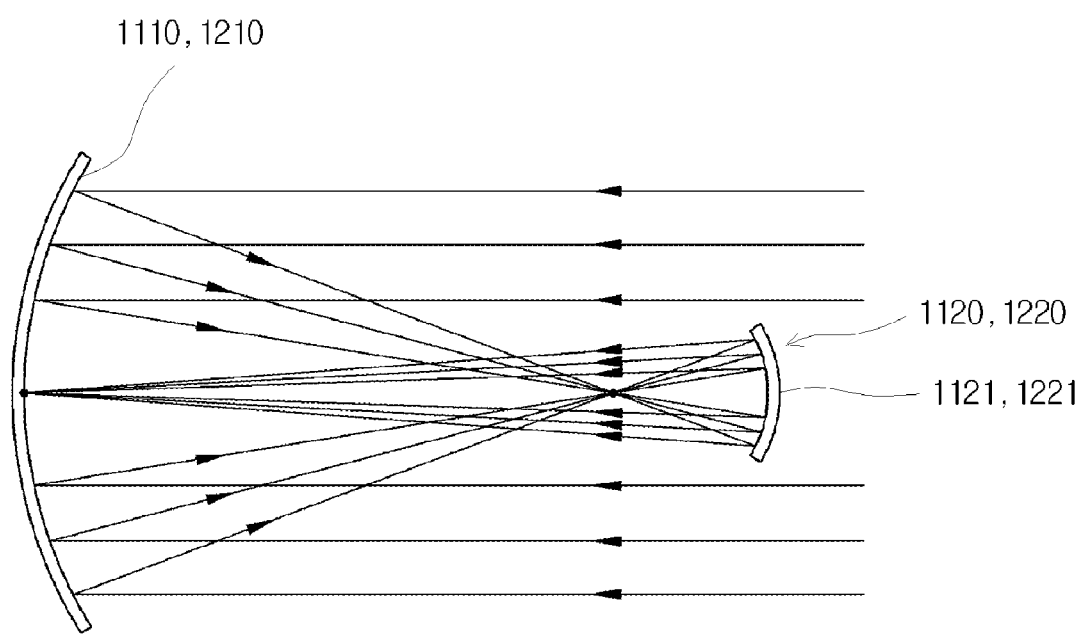
FIGS. 10 and 11 briefly illustrate a solar concentrator of the heat engine in accordance with an embodiment of the present invention.
Figure 11:
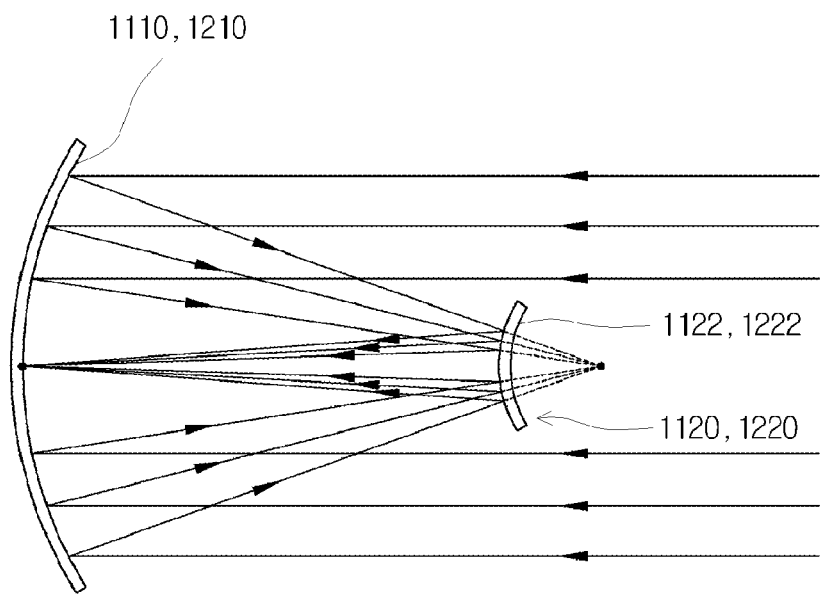

FIGS. 10 and 11 briefly illustrate a solar concentrator of the heat engine in accordance with an embodiment of the present invention. Referring to FIGS. 10 and 11, the solar concentrator 1000 can include a pair of light-gathering panels 1110, 1210 and a pair of reflectors 1120, 1220.

The light-gathering panels 1110, 1210, which are relatively larger, can collect the incident sunlight and reflect the sunlight toward the reflectors 1120, 1220, which are relatively smaller. The reflectors 1120, 1220 can collect the reflected sunlight and re-reflect the reflected sunlight to predetermined focal points. Accordingly, highly-dense sunlight can be focused at the predetermined focal points.

In this case, the light-gathering panels 1110, 1210 have parabolic curved surfaces to reflect the incident sunlight to common focal points. The reflectors 1120, 1220 can have reflecting surfaces that are concave or convex toward the light-gathering panels 1110, 1210.

For example, as it can be seen in FIG. 10, reflecting surfaces 1121, 1221 that are included in the reflectors 1120, 1220 and face the light-gathering panels 1110, 1210 can be concave. When the reflecting surfaces 1121, 1221 are concave, they are referred to as a Gregorian type. The reflecting surfaces 1121, 1221 can be formed in the shape of an elliptical surface.

Alternatively, as it can be seen in FIG. 11, reflecting surfaces 1122, 1222 that are included in the reflectors 1120, 1220 and face the light-gathering panels 1110, 1210 can be convex. When the reflecting surfaces 1122, 1222 are convex, they are referred to as a Cassegrain type. The reflecting surfaces 1122, 1222 can be formed in the shape of a hyperbolic surface.

The light-gathering panels 1110, 1210 and the reflecting surfaces 1121, 1122, 1221, 1222 can be manufactured by attaching glass minors having high reflectivity on a dish-type steel plate structure (not shown) or can be directly manufactured using aluminum having high reflectivity.

Figure 12:
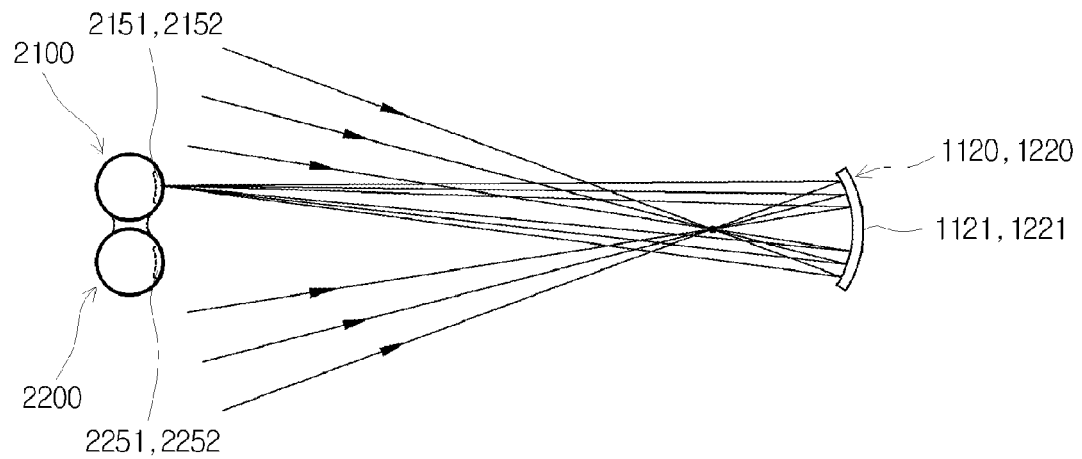
FIGS. 12 and 13 briefly illustrate how a pair of reflectors included in the heat engine in accordance with an embodiment of the present invention alternately transfer the sunlight to a first light-permeating part and a fourth light-permeating part or to a second light-permeating part and a third light-permeating part.
Figure 13:
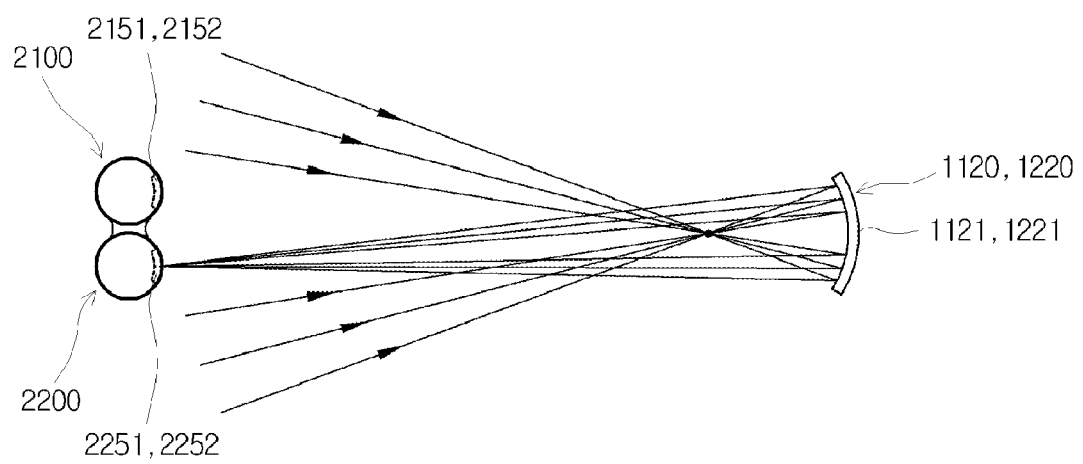

FIGS. 12 and 13 briefly illustrate how the pair of reflectors included in the heat engine in accordance with an embodiment of the present invention alternately transfer the sunlight to the first light-permeating part and the fourth light-permeating part or to the second light-permeating part and the third light-permeating part.

Referring to FIGS. 1, 12 and 13, the reflectors 1120, 1220 in accordance with the present embodiment alternately transfer the sunlight transferred from the light-gathering panels 1110, 1210 to the first to fourth light-permeating parts 2151, 2152, 2251, 2252 included in the first body 2100 and the second body 2200.

More specifically, as it can be seen in FIG. 12, one reflecting surface 1121 can converge and transfer the sunlight transferred from the light-gathering panel 1110 corresponding to said reflecting surface 1121 to the first light-permeating part 2151 included in the first body 2100. In this case, the other reflecting surface 1221 can converge and transfer the sunlight transferred from the light-gathering panel 1210 corresponding to said reflecting surface 1221 to the fourth light-permeating part 2252 included in the second body 2200.

Afterwards, the reflecting surfaces 1121, 1221 can be tilted by driving motors (not shown) included in the reflectors 1120, 1220. That is, the paths of re-reflection of the sunlight from the reflectors 1120, 1220 can be adjusted. In this case, as it can be seen in FIG. 13, the one reflecting surface 1121 can converge and transfer the sunlight transferred from the light-gathering panel 1110 corresponding to said reflecting surface 1121 to the third light-permeating part 2251 included in the second body 2200. In this case, as it can be seen in FIG. 12, the other reflecting surface 1221 can converge and transfer the sunlight transferred from the light-gathering panel 1210 corresponding to said reflecting surface 1221 to the third light-permeating part 2152 included in the first body 2100.

As the reflecting surfaces 1121, 1221 are alternately tilted in accordance with the present embodiment, the sunlight can be alternately transferred to the first light-permeating part 2151 and the fourth light-permeating part 2252 or to the second light-permeating part 2152 and the third light-permeating part 2251. In this case, the first operating gas and the fourth operating gas or the second operating gas and the third operating gas can be thermally expanded alternately. Accordingly, the first piston assembly 101 and the second piston assembly 201 can reciprocate in opposite directions with respect to each other inside the first cylinder 2110 and the second cylinder 2210, respectively.

Referring to FIGS. 2 and 3, the heat engine 1 in accordance with the present embodiment can also include a first power generator 2500 and a second power generator 2600. The first power generator 2500 and a second power generator 2600 convert the mechanical energy generated in the first body 2100 and the second body 2200, respectively, to electrical energy.

The first power generator 2500 can include a first mover 2521, a second mover 2522, a first stator 2511 and a second stator 2512. The first mover 2521 can be constituted in a module form by including at least one first magnet 2521a that is arranged on an outer wall of the first piston 110. In such a case, the first magnet 2521a can have the shape of a ring.

The second mover 2522 can be constituted in a module form by including at least one second magnet 2522b that is arranged on an outer wall of the second piston 120. In such a case, the second magnet 2522a can have the shape of a ring.

The first and second stators 2511, 2512 corresponding to the first and second movers 2521, 2522, respectively, can be arranged on the outer circumferential surface of the cylinder body 2111 of the first cylinder 2110. The first and second stators 2511, 2512 can be extended in lengthwise directions of the cylinder body 2111 of the first cylinder 2110. The first and second stators 2511, 2512 include a respective coil (not shown) and can be arranged in the shape of a ring on the outer circumferential surface of the cylinder body 2111.

In this case, in order to enhance the magnetic efficiency of the first and second stators 2511, 2512, a strong magnetic substance can be arranged around the coil (not shown) such that a magnetic circuit is formed around the coil. The first and second stators 2511, 2512 can be symmetrically arranged about the center of the first body 2100.

In the first power generator 2500 constituted as described above, induced electromotive force can be generated by a phenomenon of electromagnetic induction caused by interaction of the first mover 2521 with the first stator 2511 or interaction of the second mover 2522 with the second stator 2512 when the first piston assembly 101 reciprocates inside the first cylinder 2110.

The second power generator 2600 can include a third mover 2621, a fourth mover 2622, a third stator 2611 and a fourth stator 2612. The third mover 2621 can be constituted in a module form by including at least one third magnet 2621a that is arranged on an outer wall of the third piston 210. In such a case, the third magnet 2621a can have the shape of a ring.

The fourth mover 2622 can be constituted in a module form by including at least one fourth magnet 2622b that is arranged on an outer wall of the fourth piston 220. In such a case, the fourth magnet 2622a can have the shape of a ring.

The third and fourth stators 2611, 2612 corresponding to the third and fourth movers 2621, 2622, respectively, can be arranged on the outer circumferential surface of the cylinder body 2211 of the second cylinder 2210. The third and fourth stators 2611, 2612 can be extended in lengthwise directions of the cylinder body 2211 of the second cylinder 2210. The third and fourth stators 2611, 2612 include a respective coil (not shown) and can be arranged in the shape of a ring on the outer circumferential surface of the cylinder body 2211.

In this case, in order to enhance the magnetic efficiency of the third and fourth stators 2611, 2612, a strong magnetic substance can be arranged around the coil (not shown) such that a magnetic circuit is formed around the coil. The third and fourth stators 2611, 2612 can be symmetrically arranged about the center of the second body 2200.

In the second power generator 2600 constituted as described above, induced electromotive force can be generated by a phenomenon of electromagnetic induction caused by interaction of the third mover 2621 with the third stator 2611 or interaction of the fourth mover 2622 with the fourth stator 2612 when the second piston assembly 201 reciprocates inside the second cylinder 2210.

In the meantime, it is preferable that inner walls of the first to fourth chambers 131, 132, 231, 232, in which the first to fourth operating gases are held, excluding the first to fourth light-permeating parts 2151, 2152, 2251, 2252 and the first to fourth cooling parts 2161, 2162, 2261, 2262 are coated thick or wound with a material having low thermal conductivity, for example, ceramic, silica, etc., in order to enhance the efficiency of thermal cycle of the first and second bodies 2100, 2200.

Figure 14:
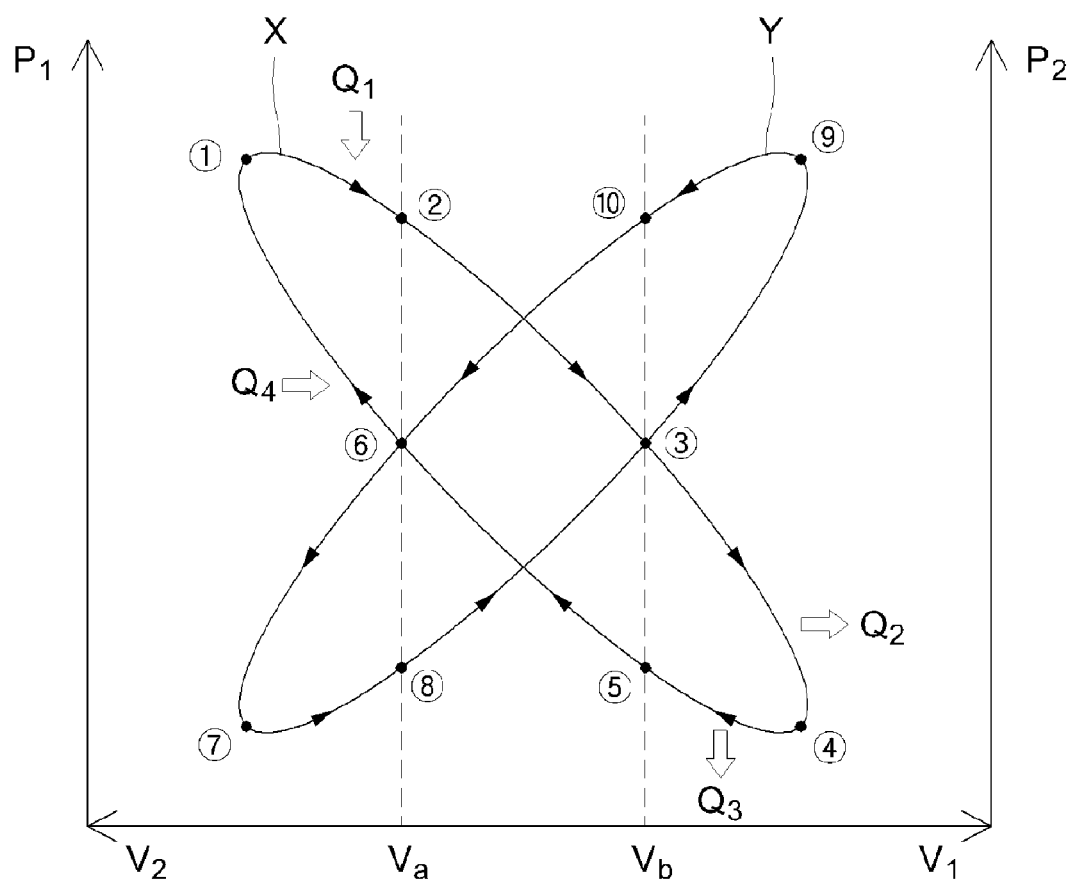
FIG. 14 is a graph showing thermodynamic cycles for first operating gas and second operating gas contained in the first cylinder of the heat engine in accordance with an embodiment of the present invention.

FIG. 14 is a graph showing thermodynamic cycles for the first operating gas and the second operating gas contained in the first cylinder of the heat engine in accordance with an embodiment of the present invention. Here, the line marked "X" is a $P_1$-$V_1$ curve for the first operating gas, and the line marked "Y" is a $P_2$-$V_2$ curve for the second operating gas. The following description of thermodynamic cycles for the first and second operating gases can be equally applied to the thermodynamic cycles for the third and fourth operating gases.

Referring to FIGS. 2, 3 and 14, when the first piston 110 moves to the left side of FIG. 3 until the volume of the first operating gas sealed in a space between the first cylinder 2110 and the first piston 110 becomes minimum, the first operating gas becomes a high-temperature thermal compression state as the first operating gas absorbs thermal energy (Q4) from the converged sunlight that has passed through the first light-permeating part 2151 (⑥→① of FIG. 14: a high-temperature thermal compression process). This process is not exactly the same as the thermal cycles of the Carnot engine and the Stirling engine but is quite similar. In this case, the first operating gas arrives at ①, which has high temperature and high pressure, as the thermal conduction is maximally shielded by the insulation member 2141 (shown in FIG. 5).

Then, as the first operating gas continues to absorb thermal energy (Q1) from the sunlight that has passed through the first light-permeating part 2151, the pressure inside the volume of the first operating gas becomes increased. In this case, the first operating gas with its pressure increased pushes the first piston 110 inside the first cylinder 2110 to an opposite side, that is, to the right side of FIG. 3, for high-temperature thermal expansion (①→②→③ of FIG. 14: a high-temperature thermal expansion process). This process is similar to the thermal cycles of the Carnot engine and the Stirling engine.

Next, when the first piston 110 moves further to the right side of FIG. 3, the first operating gas begins to make contact with the first cooling part 2161, and the pressure of the first operating gas begins to drop dramatically as the first operating gas gets cooled and expanded by inertia of the first piston 110. In this case, the solar concentrator 1000 detects the location of the first piston 110 and blocks the sunlight transferred to the first operating gas through the first light-permeating part 2151. In such a case, since the temperature of the first operating gas is still higher than that of the first cooling part 2161, some of the thermal energy (Q2) inside the first operating gas gets discharged to the outside (③→④ of FIG. 14: a low-temperature expansion process). This process is similar to the adiabatic expansion process of the Carnot cyle.

Then, the first operating gas that has expanded until it had the maximum volume makes a maximum contact with the first cooling part 2161 and becomes cooled and contracted. In such a case, the first operating gas begins to be compressed by the first piston 110. In this case also, the thermal energy (Q3) inside the first operating gas gets discharged to the outside (④→⑤ of FIG. 14: a low-temperature cooling contraction expansion process). This process corresponds to the isothermal compression process of the Carnot thermal cycle.

Then, when the first operating gas is further compressed, the first operating gas is no longer in contact with the first cooling part 2161, so the first operating gas becomes insulated and compressed (⑤→⑥ of FIG. 14). This process corresponds to the insulation compression process of the Carnot thermal cycle.

As described above, the thermal cycle (X) for the first operating gas goes through the process of ⑥→①→②→③→④→⑤→⑥ of FIG. 14.

Moreover, the thermal cycle (Y) for the second operating gas goes through the same process of the thermal cycle (X) for the first operating gas. However, according to the present embodiment, since the first piston 110 and the second piston 120 are interlocked and slides inside the first cylinder 2110, the second operating gas goes through the process of ⑥→⑦→⑧→③→⑨→⑩→⑥ of FIG. 14 while the first operating gas goes through the process of ⑥→①→②→③→④→⑤→⑥ of FIG. 14.

Meanwhile, during the processes of ⑥→①→②→③ and ⑥→⑦→⑧→③ of FIG. 14, the sunlight converged by the solar concentrator 1000 is transferred to the first operating gas through the first light-permeating part 2151. Moreover, during the process of ③→④→⑤→⑥ and ③→⑨→⑩→⑥ of FIG. 14, the sunlight converged by the solar concentrator 1000 is transferred to the second operating gas through the second light-permeating part 2152.

Figure 15:
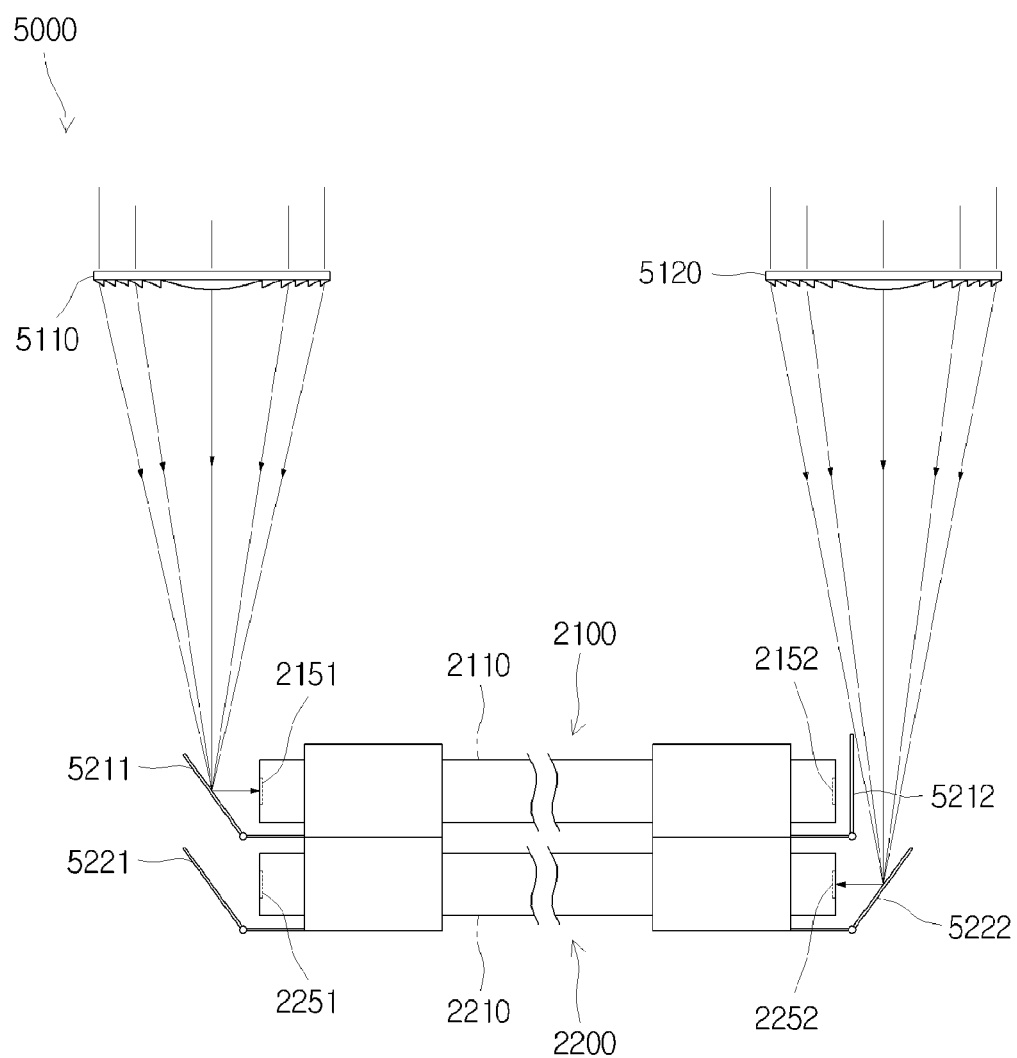
FIG. 15 is a brief illustration of a heat engine in accordance with another embodiment of the present invention.

FIG. 15 is a brief illustration of a heat engine in accordance with another embodiment of the present invention. Referring to FIG. 15, the heat engine in accordance with the present embodiment can include a first body 2100, a second body 2200 and a solar concentrator 5000.

The first body 2100 can include a first cylinder 2110 and a first piston assembly (not shown). According to the present embodiment, a first light-permeating part 2151 and a second light-permeating part 2152 can be arranged on either end of the first cylinder 2110.

The second body 2200 can include a second cylinder 2210 and a second piston assembly (not shown). According to the present embodiment, a third light-permeating part 2251 and a fourth light-permeating part 2252 can be arranged on either end of the second cylinder 2210.

According to the present embodiment, the solar concentrator 5000 can include a pair of focusing lenses 5110, 5120, a pair of movable reflecting mirrors 5211, 5212 and a pair of static reflecting mirrors 5221, 5222.

The focusing lenses 5110, 5120 can include Fresnel lenses. According to the present embodiment, the sunlight converged through the focusing lenses 5110, 5120 can be transferred to either side of the first body 2100 and the second body 2200.

The movable reflecting mirrors 5211, 5212 reflect the sunlight transferred to either side of the first body 2100 by the focusing lenses 5110, 5120 to the first light-permeating part 2151 and the second light-permeating part 2152, respectively. In this case, the movable reflecting mirrors 5211, 5212 are operated to reflect the sunlight to the first light-permeating part 2151 and the second light-permeating part 2152 alternately.

For instance, in case the movable reflecting mirror 5211, which is on the left side in FIG. 15, reflects the sunlight to the first light-permeating part 2151, the movable reflecting mirror 5212 on the right side in FIG. 15 is adjusted of its angle so as not to reflect the sunlight to the second light-permeating part 2152. In this case, the sunlight that is not reflected to the right-side movable reflecting mirror 5212 is transferred to the right-side static reflecting mirror 5222.

Moreover, although not illustrated in FIG. 15, in case the right-side movable reflecting mirror 5212 reflects the sunlight, the left-side movable reflecting mirror 5211 is adjusted of its angle so as not to reflect the sunlight to the first light-permeating part 2151. In this case, the sunlight that is not reflected to the left-side movable reflecting mirror 5211 is transferred to the left-side static reflecting mirror 5221.

The static reflecting mirrors 5221, 5222 reflect the sunlight transferred to either side of the second body 2200 by the focusing lenses 5110, 5120 to the third light-permeating part 2251 and the fourth light-permeating part 2252, respectively. In this case, the sunlight reflected by the static reflecting mirrors 5221, 5222 is transferred to the third light-permeating part 2251 and the fourth light-permeating part 2252 alternately. That is, as described above, since the movable reflecting mirrors 5211, 5212 are adjusted of their angles, the sunlight reflected by the static reflecting mirrors 5221, 5222 is transferred to the third light-permeating part 2251 and the fourth light-permeating part 2252 alternately.

According to the present embodiment, as the sunlight is alternately transferred to the first light-permeating part and the fourth light-permeating part or to the second light-permeating part and the third light-permeating part, the first operating gas and the fourth operating gas or the second operating gas and the third operating gas can be thermally expanded alternately. Accordingly, as the first operating gas and the fourth operating gas or the second operating gas and the third operating gas are thermally expanded alternately, the first piston assembly and the second piston assembly can reciprocate in opposite directions to each other in the first cylinder and the second cylinder, respectively.

Although some embodiments have been described with reference to the accompanying drawings, it shall be appreciated that other various embodiments of the present invention are possible by those who are ordinarily skilled in the art to which the present invention pertains without departing from the technical ideas or essential technical features. Therefore, it shall be understood that the above embodiments are described for illustrative purposes only and not to restrict the present invention. The scope of the present invention shall be defined by the claims appended below, rather than by the above description, and it shall be appreciated that all modifications and permutations derived from the meaning, scopes and equivalents of the claims are included in the scope of the present invention.

The invention claimed is:

1. A heat engine using solar energy, the heat engine comprising:
   a first body comprising: a first cylinder having first operating gas and second operating gas held inside either side thereof and having a first light-permeating part and a second light-permeating part arranged on either side thereof; and a first piston assembly comprising a first piston and a second piston slidably arranged inside either side of the first cylinder and a first connector connecting the first piston with the second piston;
   a second body comprising: a second cylinder having third operating gas and fourth operating gas held inside either side thereof and having a third light-permeating part and a fourth light-permeating part corresponding respectively to the first light-permeating part and the second light-permeating part arranged on either side thereof; and a second piston assembly comprising a third piston and a fourth piston slidably arranged inside either side of the second cylinder and a second connector connecting the third piston with the fourth piston, the second body being arranged adjacent to and parallel to the first body; and
   a solar concentrator configured to converge sunlight and to transfer the converged sunlight alternately to the first light-permeating part and the fourth light-permeating part or to the second light-permeating part and the third light-permeating part to thermally expand the first operating gas and the fourth operating gas alternately or the second operating gas and the third operating gas alternately,
   wherein the first piston assembly and the second piston assembly reciprocate in opposite directions to each other inside the first cylinder and the second cylinder, respectively, as the first operating gas and the fourth operating gas or the second operating gas or the third operating gas thermally expand alternately.

2. The heat engine of claim 1, further comprising an interlocking part interlocking the first piston assembly with the second piston assembly.

3. The heat engine of claim 2, wherein the interlocking part comprises:
   a first rack portion formed on one side of the first connector;
   a second rack portion formed on a side of the second connector facing the first connector; and
   a pinion interlocking with the first rack portion and the second rack portion.

4. The heat engine of claim 1, wherein the first body further comprises:
   a first cooling part arranged on one side of the first cylinder and configured to cool the first operating gas that is expanded; and
   a second cooling part arranged on the other side of the first cylinder and configured to cool the second operating gas that is expanded, and
   wherein the second body further comprises:
   a third cooling part arranged on one side of the second cylinder and configured to cool the third operating gas that is expanded; and
   a fourth cooling part arranged on the other side of the second cylinder and configured to cool the fourth operating gas that is expanded.

5. The heat engine of claim 1, wherein black body powder is held together with the first to fourth operating gases inside either side of the first cylinder and the second cylinder.

6. The heat engine of claim 1, wherein the solar concentrator comprises:
   a pair of light-gathering panels facing the sun; and
   a pair of reflectors configured to re-reflect the sunlight reflected from the pair of light-gathering panels toward the first body and the second body, respectively, and
   wherein each of the pair of reflectors is configured to adjust a path of re-reflecting the sunlight.

7. The heat engine of claim 6, wherein each of the pair of reflectors adjusts the path of re-reflecting the sunlight by detecting locations of the first piston assembly and the second piston assembly.

8. The heat engine of claim 1 wherein:
the first light-permeating part and the second light-permeating part are arranged on either side end of the first cylinder;
the third light-permeating part and the fourth light-permeating part are arranged on either side end of the second cylinder; and
the solar concentrator comprises: a pair of focusing lenses separated from each other and configured to transfer the sunlight to the first body and the second body, respectively; a pair of movable reflecting mirrors arranged on either side of the first body and configured to reflect the sunlight transferred through the focusing lenses to the first light-permeating part and the second light-permeating part, respectively; and a pair of static reflecting mirrors arranged on either side of the second body and configured to reflect the sunlight transferred through the focusing lenses to the third light-permeating part and the fourth light-permeating part, respectively,
wherein angles of the movable reflecting mirrors are adjustable such that the sunlight having passed through the focusing lenses reaches the static reflecting mirrors or is blocked by the movable reflecting mirrors.

9. The heat engine according to claim 1, further comprising:
a first power generator comprising: a first mover comprising a first magnet arranged on an outer wall of the first piston; a second mover comprising a second magnet arranged on an outer wall of the second piston; a first stator arranged on an outer circumferential surface of the first cylinder in correspondence with the first mover and configured to generate induced electromotive force by interacting with the first mover that reciprocates; and a second stator arranged on an outer circumferential surface of the first cylinder in correspondence with the second mover and configured to generate induced electromotive force by interacting with the second mover that reciprocates; and
a second power generator comprising: a third mover comprising a third magnet arranged on an outer wall of the third piston; a fourth mover comprising a fourth magnet arranged on an outer wall of the fourth piston; a third stator arranged on an outer circumferential surface of the second cylinder in correspondence with the third mover and configured to generate induced electromotive force by interacting with the third mover that reciprocates; and a fourth stator arranged on an outer circumferential surface of the second cylinder in correspondence with the fourth mover and configured to generate induced electromotive force by interacting with the fourth mover that reciprocates.

10. The heat engine according to claim 2, further comprising:
a first power generator comprising: a first mover comprising a first magnet arranged on an outer wall of the first piston; a second mover comprising a second magnet arranged on an outer wall of the second piston; a first stator arranged on an outer circumferential surface of the first cylinder in correspondence with the first mover and configured to generate induced electromotive force by interacting with the first mover that reciprocates; and a second stator arranged on an outer circumferential surface of the first cylinder in correspondence with the second mover and configured to generate induced electromotive force by interacting with the second mover that reciprocates; and
a second power generator comprising: a third mover comprising a third magnet arranged on an outer wall of the third piston; a fourth mover comprising a fourth magnet arranged on an outer wall of the fourth piston; a third stator arranged on an outer circumferential surface of the second cylinder in correspondence with the third mover and configured to generate induced electromotive force by interacting with the third mover that reciprocates; and a fourth stator arranged on an outer circumferential surface of the second cylinder in correspondence with the fourth mover and configured to generate induced electromotive force by interacting with the fourth mover that reciprocates.

11. The heat engine according to claim 3, further comprising:
a first power generator comprising: a first mover comprising a first magnet arranged on an outer wall of the first piston; a second mover comprising a second magnet arranged on an outer wall of the second piston; a first stator arranged on an outer circumferential surface of the first cylinder in correspondence with the first mover and configured to generate induced electromotive force by interacting with the first mover that reciprocates; and a second stator arranged on an outer circumferential surface of the first cylinder in correspondence with the second mover and configured to generate induced electromotive force by interacting with the second mover that reciprocates; and
a second power generator comprising: a third mover comprising a third magnet arranged on an outer wall of the third piston; a fourth mover comprising a fourth magnet arranged on an outer wall of the fourth piston; a third stator arranged on an outer circumferential surface of the second cylinder in correspondence with the third mover and configured to generate induced electromotive force by interacting with the third mover that reciprocates; and a fourth stator arranged on an outer circumferential surface of the second cylinder in correspondence with the fourth mover and configured to generate induced electromotive force by interacting with the fourth mover that reciprocates.

12. The heat engine according to claim 4, further comprising:
a first power generator comprising: a first mover comprising a first magnet arranged on an outer wall of the first piston; a second mover comprising a second magnet arranged on an outer wall of the second piston; a first stator arranged on an outer circumferential surface of the first cylinder in correspondence with the first mover and configured to generate induced electromotive force by interacting with the first mover that reciprocates; and a second stator arranged on an outer circumferential surface of the first cylinder in correspondence with the second mover and configured to generate induced electromotive force by interacting with the second mover that reciprocates; and
a second power generator comprising: a third mover comprising a third magnet arranged on an outer wall of the third piston; a fourth mover comprising a fourth magnet arranged on an outer wall of the fourth piston; a third stator arranged on an outer circumferential surface of the second cylinder in correspondence with the third mover and configured to generate induced electromotive force by interacting with the third mover that reciprocates; and a fourth stator arranged on an outer circumferential surface of the second cylinder in correspondence with the fourth mover and configured to generate induced electromotive force by interacting with the fourth mover that reciprocates.

13. The heat engine according to claim 5, further comprising:
   a first power generator comprising: a first mover comprising a first magnet arranged on an outer wall of the first piston; a second mover comprising a second magnet arranged on an outer wall of the second piston; a first stator arranged on an outer circumferential surface of the first cylinder in correspondence with the first mover and configured to generate induced electromotive force by interacting with the first mover that reciprocates; and a second stator arranged on an outer circumferential surface of the first cylinder in correspondence with the second mover and configured to generate induced electromotive force by interacting with the second mover that reciprocates; and
   a second power generator comprising: a third mover comprising a third magnet arranged on an outer wall of the third piston; a fourth mover comprising a fourth magnet arranged on an outer wall of the fourth piston; a third stator arranged on an outer circumferential surface of the second cylinder in correspondence with the third mover and configured to generate induced electromotive force by interacting with the third mover that reciprocates; and a fourth stator arranged on an outer circumferential surface of the second cylinder in correspondence with the fourth mover and configured to generate induced electromotive force by interacting with the fourth mover that reciprocates.

14. The heat engine according to claim 6, further comprising:
   a first power generator comprising: a first mover comprising a first magnet arranged on an outer wall of the first piston; a second mover comprising a second magnet arranged on an outer wall of the second piston; a first stator arranged on an outer circumferential surface of the first cylinder in correspondence with the first mover and configured to generate induced electromotive force by interacting with the first mover that reciprocates; and a second stator arranged on an outer circumferential surface of the first cylinder in correspondence with the second mover and configured to generate induced electromotive force by interacting with the second mover that reciprocates; and
   a second power generator comprising: a third mover comprising a third magnet arranged on an outer wall of the third piston; a fourth mover comprising a fourth magnet arranged on an outer wall of the fourth piston; a third stator arranged on an outer circumferential surface of the second cylinder in correspondence with the third mover and configured to generate induced electromotive force by interacting with the third mover that reciprocates; and a fourth stator arranged on an outer circumferential surface of the second cylinder in correspondence with the fourth mover and configured to generate induced electromotive force by interacting with the fourth mover that reciprocates.

15. The heat engine according to claim 7, further comprising:
   a first power generator comprising: a first mover comprising a first magnet arranged on an outer wall of the first piston; a second mover comprising a second magnet arranged on an outer wall of the second piston; a first stator arranged on an outer circumferential surface of the first cylinder in correspondence with the first mover and configured to generate induced electromotive force by interacting with the first mover that reciprocates; and a second stator arranged on an outer circumferential surface of the first cylinder in correspondence with the second mover and configured to generate induced electromotive force by interacting with the second mover that reciprocates; and
   a second power generator comprising: a third mover comprising a third magnet arranged on an outer wall of the third piston; a fourth mover comprising a fourth magnet arranged on an outer wall of the fourth piston; a third stator arranged on an outer circumferential surface of the second cylinder in correspondence with the third mover and configured to generate induced electromotive force by interacting with the third mover that reciprocates; and a fourth stator arranged on an outer circumferential surface of the second cylinder in correspondence with the fourth mover and configured to generate induced electromotive force by interacting with the fourth mover that reciprocates.

16. The heat engine according to claim 8, further comprising:
   a first power generator comprising: a first mover comprising a first magnet arranged on an outer wall of the first piston; a second mover comprising a second magnet arranged on an outer wall of the second piston; a first stator arranged on an outer circumferential surface of the first cylinder in correspondence with the first mover and configured to generate induced electromotive force by interacting with the first mover that reciprocates; and a second stator arranged on an outer circumferential surface of the first cylinder in correspondence with the second mover and configured to generate induced electromotive force by interacting with the second mover that reciprocates; and
   a second power generator comprising: a third mover comprising a third magnet arranged on an outer wall of the third piston; a fourth mover comprising a fourth magnet arranged on an outer wall of the fourth piston; a third stator arranged on an outer circumferential surface of the second cylinder in correspondence with the third mover and configured to generate induced electromotive force by interacting with the third mover that reciprocates; and a fourth stator arranged on an outer circumferential surface of the second cylinder in correspondence with the fourth mover and configured to generate induced electromotive force by interacting with the fourth mover that reciprocates.

\* \* \* \* \*